3,637,841
PROCESS FOR CARBOXYLIC ACID HALIDE
MANUFACTURE
Brian Martin, Erie, Pa., assignor to The Dow Chemical
Company, Midland, Mich.
No Drawing. Filed Nov. 29, 1967, Ser. No. 686,710
Int. Cl. C07c 51/58
U.S. Cl. 260—544 M          13 Claims

ABSTRACT OF THE DISCLOSURE

Carboxylic acid halides are made by a new process comprising contacting the vapors of the corresponding carboxylic acid and a hydrogen halide at a temperature between 100° and 600° C., adding the vapor of an inert, water-insoluble solvent, condensing the resulting vaporous mixture and removing the desired acid halide from the solvent phase. While not necessary to the invention, a wide range of catalysts may be used to improve yields.

BACKGROUND OF THE INVENTION

This invention is based on the following reaction:

$$RCOOH + HX \rightleftarrows RCOX + HOH$$

wherein X is halogen. Acid halides are very sensitive to hydrolysis and it is well known in the art that the above reaction proceeds spontaneously in the reverse direction.

SUMMARY OF THE INVENTION

It has now been found that when the vapors of an inert, water-insoluble solvent are added to a vaporous mixture of a carboxylic acid and a hydrogen halide at about 100–600° C., the condensate of the resulting mixture consists of a solvent phase, in which the unreacted acid and the product acid halide exist, and a water phase. This discovery permits acid halides to be produced by a reaction heretofore useless for their production. This result is quite surprising for two reasons: (1) there is little or no hydrolysis of the acid halide product even though there exists an interface at which the reaction could occur and (2) the product acid halide is known to be reactive with the unreacted acid and both are present in the solvent phase.

In order to practice our invention, the vapors of a carboxylic acid and a hydrogen halide are contacted in any convenient manner at a temperature between 100° and 600° C. At a time prior to condensation the vapor of an inert, water-insoluble solvent is added to form a mixture which is then condensed. The solvent may be added either before or after reaction so long as the addition is prior to the condensation step. The desired acid halide is then separated from the solvent phase of the condensate by conventional means, e.g. distillation. We prefer to conduct the reaction of the acid and hydrogen halide in the presence of a heterogeneous catalyst, however, the catalyst is not necessary to the invention and a significant amount of reaction is obtained without using any catalyst.

The acid halides produced in the invention correspond to the carboxylic acid starting material. Substantially all carboxylic acids which are volatile and not decomposed under the reaction conditions are converted to their corresponding acid halide provided they do not contain other groups which react with hydrogen halide under the conditions present. Examples of aromatic carboxylic acids suitable for this invention are benzoic, naphthoic, anthracenecarboxylic, furoic and thiophenecarboxylic acids. Of course, these acids can contain ring-substituents such as alkyl, aryl, halo, nitro, hydroxy, alkoxy and aryloxy. Aliphatic carboxylic acids which are volatile and not decomposed under the reaction conditions are also converted to their corresponding acid halides provided that they do not contain other groups which react with hydrogen halide under the conditions present. Examples of aliphatic acids suitable for this invention are the fatty acids, such as acetic, valeric, lauric and stearic. Of course, these acids can also contain substituted groups such as alkyl, aryl, halo, nitro, hydroxy, alkoxy and aryloxy. Examples of typical conversions are benzoic acid to benzoyl chloride, toluic acid to toluyl chloride, o-chlorobenzoic acid to o-chlorobenzoyl bromide, m-nitrobenzoic acid to m-nitrobenzoyl chloride, p-hydroxybenzoic acid to p-hydroxybenzoyl bromide, p-methoxybenzoic to p-methoxybenzoyl chloride, acetic acid to acetyl chloride, caprylic acid to capryloyl chloride, acrylic to acryloyl chloride, cyclohexanecarboxylic to cyclohexanecarbonyl chloride, α-bromopropionic acid to α-bromopropionyl bromide, α-methylbutyric to α-methylbutyryl chloride, α-phenylvaleric to α-phenylvaleryl bromide, α-hydroxylauric to α-hydroxylauroyl chloride, α-nitrostearic acid to α-nitrostearoyl chloride and β-methoxycaproic to β-methoxycaproyl bromide.

Generally, as the molecular weight of the acid halide produced decreases, the rate of hydrolysis increases; while not necessary, it may be convenient to remove the water formed in the reaction as it condenses. This will increase yields in the production of the acid halide and can be done in several ways. One method is to add a water-absorbing compound or complex to the product collection vessel so that the water is effectively removed as it is condensed. Suitable substances are calcium chloride, sodium sulfate, magnesium sulfate, calcium sulfate, magnesium perchlorate, silica gel and zinc chloride. Another method is to pass the product vapors through a condenser which is at a temperature between 0° and 90° C. (thus condensing the water and some unreacted acid) and then passing the remaining vapors into an inert solvent which is at a temperature between —20° and 50° C. (preferably the same solvent which was previously added) and thus obtaining the product acid halide. Both methods will facilitate production of acid halides from their corresponding acids.

The solvent which is necessary to the invention must be inert to the reaction conditions and substantially water-insoluble. A large number of the usual solvents may be used. Examples of a few are benzene, bromobenzene, carbon tetrachloride, ortho-dichlorobenzene, heptane, perchloroethylene, chloroform, trichloroethylene and xylene.

The hydrogen halide which is used in the invention is either hydrogen chloride or hydrogen bromide. The weight ratios of materials added are not critical to the invention and may suitably vary from 1 to 200 parts hydrogen halide and 0.2 to 50 parts solvent per part of carboxylic acid. The preferred weight ratio is from 5 to 50 parts hydrogen halide and 2 to 20 parts solvent per part of carboxylic acid.

The temperature at which the reaction occurs is between 100° and 600° C. The preferred temperature range is between 250° and 500° C. (most preferably between 300° and 400° C.). Although we prefer atmospheric pressure, the reaction will occur at both subatmospheric and super-atmospheric pressures.

Although a heterogeneous catalyst is not necessary to the invention, it is preferred to allow the reaction to occur in the presence of a catalytic amount of a compound of an element of Groups I(a), II(a), III(a), IV(a), V(a), the transition metals, the lanthanides or the actinides. In general, any compound of the elements of the named groups which is a solid and which is unreactive under the reaction conditions is a suitable catalyst.

DESCRIPTION OF SPECIFIC EMBODIMENTS

It was found that the catalyst sometimes swells during first use in the reaction and causes difficulty in containment. While not necessary to the invention, it is convenient to pretreat the catalysts prior to reaction. The following procedure was used: The catalysts were first ground and sieved to 6–14 mesh. This material (3 parts by weight) was mixed with benzoic acid (1 part) and heated in an oven to 200° C. When the acid had melted an open tube through which hydrogen chloride was slowly passing was inserted beneath the surface of the catalyst and with this the mixture was occasionally stirred. After 3 hours there was no further loss in weight and the catalyst had returned to its original dry appearance.

The following are specific examples of the practice of our invention. In all experiments, for convenience, the catalyst was pretreated as described above.

Example 1

To a tubular reactor of 3.4 cm. internal diameter equipped with heater windings, constant temperature regulator and thermometer was added 100 g. of the treated catalyst (alumina granules 8–14 mesh). This produced a column about 10.5 cm. long and about 95 cm.$^3$ volume. It was heated to 330±1° C.

Hydrogen chloride from a cylinder was fed at a rate of 20 g./hr. to a preheater and vaporizer, which also received a 5.00% solution of benzoic acid in bromobenzene. The mixture of vapors passed immediately into the reactor and from there to a condenser and finally were bubbled through xylene at 0° C. to condense any remaining vapors.

The system was equilibrated for several hours prior to use. During a run of 182 min. duration, 38.2 cm.$^3$ of solution was fed in, containing 1.908 g. of benzoic acid. The condensate was analyzed by titration and found to contain 0.614 g. of benzoyl chloride and 1.370 g. of benzoic acid. This represents a conversion of 28.2% with a yield of 99%.

Example 2

Using a similar procedure with 16.8 grams of alumina catalyst and a temperature of 300° C., the following results were obtained:

| Acid | Acid halide | Percent of— Conversion | Yield |
|---|---|---|---|
| Benzoic | Benzoyl chloride | 16.4 | 99 |
| Do | Benzoyl bromide | 27.0 | 100 |
| m-Toluic | m-Toluyl chloride | 20.0 | 100 |
| Caproic | Caproyl chloride | 25.0 | 100 |
| Chloroacetic | Chloroacetyl chloride | 17.0 | 62 |

Example 3

Using the same apparatus with anhydrous calcium chloride in the collection vessel, 11 grams of calcium chloride as a catalyst, 20 grams/hr. of hydrogen chloride, 5 mls./hr. of chlorobenzene, and 1.12 grams/hr. acetic acid, the effect of temperature on the amount of acetyl chloride was measured.

| Temperature, ° C. | Percent of— Conversion | Yield |
|---|---|---|
| 270 | 8.8 | 97 |
| 300 | 10.2 | 98 |
| 330 | 11.7 | 99 |
| 360 | 14.4 | 99 |
| 390 | 16.0 | 90 |
| 420 | 15.4 | 87 |

Examples of catalysts which are useful are shown in Table I below. This list is merely a representative group. The degree of conversion effected by different catalysts in standard reaction conditions is shown. Yields were essentially quantitative in each case and the apparatus used was the same as in Example 1. The conditions chosen are not optimum reaction conditions but rather convenient ones, temperature, 300° C., hydrogen chloride flow, 21.1 gms./hr., benzoic acid flow, 1.25 gms./hr. and solvent bromobenzene, 23.9 mls./hr. The differing weights of the catalysts are due to their material densities, each representing about 20 ml. of 6–14 mesh material.

TABLE I

| Catalyst | Weight (gms.) | Conversion, percent |
|---|---|---|
| Alumina | 16.8 | 16 |
| Manganese chloride | 7.2 | 17.8 |
| Calcium chloride | 5.2 | 17.6 |
| Uranyl acetate | 22.1 | 17.2 |
| Lanthanum chloride | 11.5 | 16.9 |
| Charcoal | 10.7 | 13.9 |
| Polyphosphoric acid (22% $P_2O_5$) on pumice | 8.2 | 13.4 |
| Polyphosphoric acid (35% $P_2O_5$) on pumice | 11.1 | 12.0 |
| Potassium polyphosphate (27.5%) on pumice | 6.7 | 3.4 |
| Sodium polyphosphate | 10.8 | 2.4 |
| Lead oxide | 10.2 | 2.4 |
| Pumice | 6.5 | 1.8 |
| Potassium chloride | 5.7 | 1.1 |

Other suitable catalysts include rubidium chloride, barium chloride, boric oxide, thallic oxide, stannic oxide, antimony trioxide, bismuth trioxide, titanium dioxide, zirconium oxide, ferric oxide, zinc oxide, cerium dioxide, praseodymium chloride, thorium dioxide and tungsten dioxide.

I claim:

1. The process for making a carboxylic acid chloride or bromide which comprises contacting the vapors of the corresponding carboxylic acid with gaseous hydrogen chloride or hydrogen bromide at a temperature between 100° and 600° C., mixing the resultant vapors with the vapor of an inert, water-insoluble solvent for the acid chloride or bromide, condensing the resultant vaporous mixture and removing the carboxylic acid chloride or bromide from the solvent phase.

2. A process as defined in claim 1 wherein the weight ratios of materials added are from 1 to 200 parts hydrogen chloride or bromide and 0.2 to 50 parts solvent per part of carboxylic acid.

3. A process as defined in claim 1 wherein the reaction occurs in the presence of a catalytic amount of a compound of an element of Groups I(a), II(a), III(a), IV(a), V(a), the transition metals, the lanthanides or the actinides wherein the catalytic compound is a solid and unreactive under the reaction conditions.

4. A process as defined in claim 1 wherein the water formed in the process is effectively removed by a water absorbing substance which is present in the product collection vessel.

5. A process as defined in claim 1 comprising condensing the unreacted acid and water formed in the reaction at a temperature between 0 and 90° C. such that the acid chloride remains substantially in vapor form and passing the resulting uncondensed vapors into an inert solvent for the acid chloride at a temperature between —20 and 50° C. such that the acid chloride is substantially condensed and dissolved therein.

6. A process as defined in claim 1 wherein the acid is benzoic and the solvent is bromobenzene.

7. A process as defined in claim 1 wherein the acid is acetic and the solvent is chlorobenzene.

8. A process as defined in claim 1 wherein the catalyst is calcium chloride.

9. A process as defined in claim 3 wherein the catalyst is alumina.

10. A process as defined in claim 4 wherein the water absorbing substance is calcium chloride.

11. The process of claim 3 wherein the carboxylic acid is benzoic, toluic, caproic, acetic or chloroacetic acid.

12. The process of claim 1 wherein the mixture is condensed in stages such that a first stage condensate contains a high proportion of carboxylic acid and water and a low proportion of acid chloride or bromide and a second stage condensate contains a high proportion of acid chloride or bromide and a low proportion of carboxylic acid and water.

13. A process as defined in claim 12 wherein a high proportion of the solvent is condensed in the second stage, thus to form a condensate having an organic phase and an aqueous phase, said phases are then separated and the acid chloride or bromide is recovered from the organic phase.

References Cited

FOREIGN PATENTS 476,435   8/1951   Canada _____ 260—544

OTHER REFERENCES

March, Advanced Org. Chem., pp. 346-7, QD251M2.

LORRAINE A. WEINBERGER, Primary Examiner

E. J. GLEIMAN, Assistant Examiner

U.S. Cl. X.R.

260—332.2 C, 347.3, 408, 544 L, 544 Y